July 9, 1935.  A. MOORE  2,007,767

COMBUSTION CHAMBER CONSTRUCTION

Filed Sept. 17, 1930

INVENTOR
*Arlington Moore*
BY
*Dyke and Schaines*
ATTORNEYS

Patented July 9, 1935

2,007,767

UNITED STATES PATENT OFFICE 2,007,767

COMBUSTION CHAMBER CONSTRUCTION

Arlington Moore, New York, N. Y., assignor, by mesne assignments, to Maxmoor Corporation, New York, N. Y., a corporation of Delaware Application September 17, 1930, Serial No. 482,467

3 Claims. (Cl. 123—193)

My invention relates to combustion chamber constructions for internal combustion engines, and particularly for L-head engines, and the same has for its object to provide a construction which reduces detonation or knocking by physically controlling the heat and flame propagation to prevent the development of auto-ignition temperatures and pressures.

Another object of the invention is to provide a construction of the character specified in which the combustion chamber is formed to maintain high velocity of flow of charge mixture in a part thereof in offset relation to the piston for preventing cooling of the charge and the rendering thereof heterogeneous.

Another object of the invention is to provide a structure of the character specified in which the combustion chamber space is distributed to maintain high velocity of flow of the charge mixture in one part thereof and to allow expansion of the flame wave in another part thereof to prevent or reduce detonation.

Another object of the invention is to provide a construction of the character specified in which the combustion chamber parts are relatively proportioned in volume and distributed to effect high velocity of flow of charge mixture in one part thereof and abrupt expansion of the flame wave by venting into another part thereof, compensating in volume for the reduction in volume of the other part by maintaining a predetermined clearance volume.

Other objects will in part be obvious and in part be pointed out hereinafter.

Figure 1:
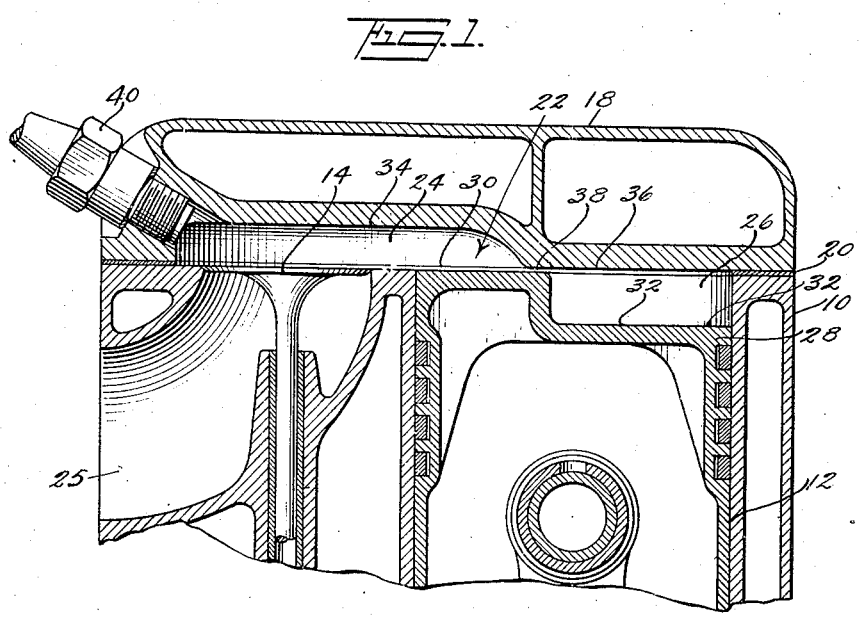
Figure 2:
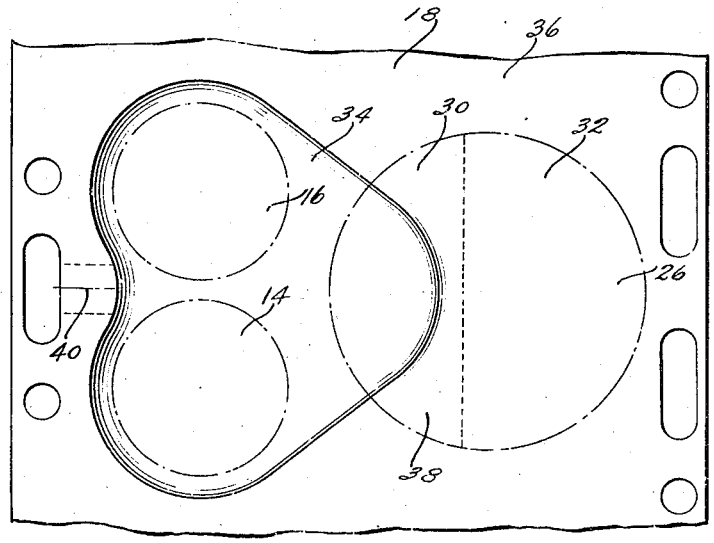

In the accompanying drawing:

Figure 1 is a sectional elevation of one form of combustion chamber constructed according to and embodying my said invention; and Fig. 2 is an inverted plan of the cylinder head thereof.

Referring to the drawing, the cylinder block 10 is illustrated as of the standard L-head form, with the cylinder bore 12, and inlet valve 14 and exhaust valve 16 disposed laterally of the cylinder bore, the inlet and exhaust valves being arranged in a straight line so as to be operated from the usual single cam shaft located low down in the engine, alongside the crank shaft and driven directly therefrom. One cylinder of the several usually employed is illustrated.

The hollow water containing cylinder head 18 is disposed upon the cylinder block with the usual gasket 20 therebetween, the cylinder head and cylinder block forming therebetween a combustion chamber 22 of predetermined compression ratio or clearance volume.

The fixed portion 24 of the combustion chamber overlying the valves is of reduced uniform depth, preferably of a depth which is a minimum for allowing full opening movement of the valves, and the volume of such portion or part 24 is the minimum required to receive both valves and allow the opening thereof, the cross-sectional area thereof in the direction of charge flow approximating as far as practical the cross-sectional area of the conduit 25 supplying the charge mixture thereto.

The reduction in volume of the part 24 of the combustion chamber above the valves is compensated for in order to provide a predetermined clearance volume or compression ratio by enlarging the part 26 of the combustion chamber above the piston 28, the enlargement being preferably provided in the piston.

As illustrated, the enlargement 26 is preferably obtained by forming the piston with a relatively elevated portion or segment 30 lying, in the top dead center position of the piston, substantially flush with the top of the cylinder block at the valve side and with a relatively reduced portion or segment 32 at the side remote from the valves of larger transverse area than the portion 30.

The part 24 of the combustion chamber is preferably formed as a recessed portion 34 in the cylinder head 18 which extends over the part 30. Beyond the portion 34 the cylinder head 18 is formed as a flat portion 36 of reduced elevation lying substantially in the plane of the gasket 20. As shown in Fig. 2, the recess 34 converges away from the valves to cover the central part of the portion 30, so that the flat portion 36 overlies the major portion of the piston 28, including the segment 30 beyond the portion 34 thereof overlapped by the recessed portion 34. This construction provides, in the top dead center position of the piston, a combustion chamber having the reduced portion 24 thereof connected to the enlarged portion 26 through a vent 38 of relatively narrow depth, determined by the thickness of the gasket 20, and of a width towards the chamber part 26 narrower in the middle than the ends, as illustrated in Fig. 2.

The enlargement of the combustion chamber part 26 is obtained by making the depth of the portion 32 (the spacing between the piston and cylinder head in the top dead center position of the piston) greater than the depth of the part 24. The recess 32 formed in the piston is however shallow, having a width greater than the depth thereof, and a transverse area greater than one half the area of the piston.

A spark plug or other ignition means 40 is located in the lateral portion 24 of the combustion chamber at the sides of the valves remote from the piston, or additional spark plugs may be employed.

In operation, the charge mixture in a homogeneous state is admitted into the combustion chamber upon the intake stroke of the piston, and travels at high velocity through the relatively highly restricted portion 24 to the cylinder, thereby preventing expansion of the charge and such cooling thereof as to render the mixture heterogeneous because of fuel precipitation and hence more likely to cause detonation.

Upon ignition, with the piston substantially in top dead center position, the flame wave travels from the spark plug at first through the restricted space 24 and then is vented through the narrow space 38 and abruptly expanded into the space 26, the maintaining of homogeneity of charge mixture by high velocity of travel in the part 24 and the sudden expansion of the flame wave into the part 26 through vent 38 serving to prevent or reduce detonation.

In my invention, the space 24 between the valves and the cylinder head in which the flame waves are initially propagated, is confined in depth to that for proper valve opening irrespective of the total clearance volume (or compression ratio) of the combustion chamber, the remaining space necessary for obtaining a given clearance volume being formed above the piston. That is to say, for a given clearance volume, in the absence of the expansion space 32, the depth of the portion 24 would have to be greater. By my invention, therefore, the desired clearance volume is obtained while providing expansion space for reducing detonation.

It is a characteristic of my invention that while small clearance volumes or high compression ratios may be employed, nevertheless, with the small space available, detonation is effectively reduced by expansion of the flame front or fronts, and precipitation of fuel above the valves, due to cooling resulting from charge expansion, is prevented.

Upon the exhaust stroke of the piston the vent 38, as the piston reaches top dead center position, serves to retard the passage or discharge of the exhaust gases from the recess 32 in the piston. Upon the suction stroke of the piston the incoming charge mixture sweeps into the cylinder and into recess 32 causing a thorough intermixing of the charge and inert gases to form a mixture less liable to detonate.

With the combustion chamber thus formed it is possible to operate engines on gasoline or on fuels heavier than gasoline employing higher compression ratios than usual without causing detonation, or the development of temperatures due to adiabatic compression liable to cause pre-ignition and cracking of fuel resulting in the formation of solid deposits or residues. The use of special fuels, such as benzol blends, for preventing detonation is therefore rendered unnecessary.

Having thus described my invention, what I claim and desire to secure by Letters Patent is:

1. In an internal combustion engine, a cylinder block having a bore, a piston therein, intake and exhaust valves on said block laterally of said bore, a cylinder head having a shallow recessed portion overlying the valves and an adjacent portion of the piston and a portion having a substantially flat inner surface overlying the remaining portion of the piston substantially at the juncture of the cylinder block and cylinder head, said cylinder block contiguous to the valves and said recessed portion forming therebetween a combustion chamber part of reduced depth, and said flat portion and said piston forming therebetween an abruptly enlarged combustion chamber part and a restricted vent between said combustion chamber parts.

2. In an internal combustion engine, a cylinder block having a bore, a piston therein, intake and exhaust valves on said block laterally of said bore, a cylinder head having a shallow recessed portion overlying the valves and a portion having an inner substantially flat surface overlying the piston substantially at the juncture of the cylinder block and cylinder head, said cylinder block contiguous to the valves and said recessed portion forming therebetween a combustion chamber part of reduced depth, and said piston having an elevated portion at the side towards the valves and a reduced portion at the side remote from the valves and forming a recess therein providing an abruptly enlarged combustion chamber part, and said shallow recessed portion extending over a part of the elevated portion of the piston, and said flat surface and said elevated portion forming a restricted vent between said combustion chamber parts in the top dead center position of the piston.

3. In an internal combustion engine, a cylinder block having a bore, intake and exhaust valves on said block laterally of said bore, a piston in said bore having an elevated portion at the side thereof contiguous to the valves and an abruptly reduced portion therein at the side remote from the valves, a cylinder head having a shallow recessed portion overlying the valves and a central part of the elevated portion of the piston, and a portion having a substantially flat inner surface overlying the remaining portion of the piston substantially at the juncture of the cylinder block and cylinder head, said recessed portion forming a combustion chamber part of reduced depth contiguous to the valves, and said flat portion and the reduced portion of said piston providing therebetween an abruptly enlarged combustion chamber part, said parts in the top dead center position of the piston communicating through a restricted vent between the elevated portion of the piston and said flat portion.

ARLINGTON MOORE.